April 16, 1935.  R. C. MAXEDON ET AL  1,997,738
STEERING WHEEL COVER
Filed Nov. 20, 1934
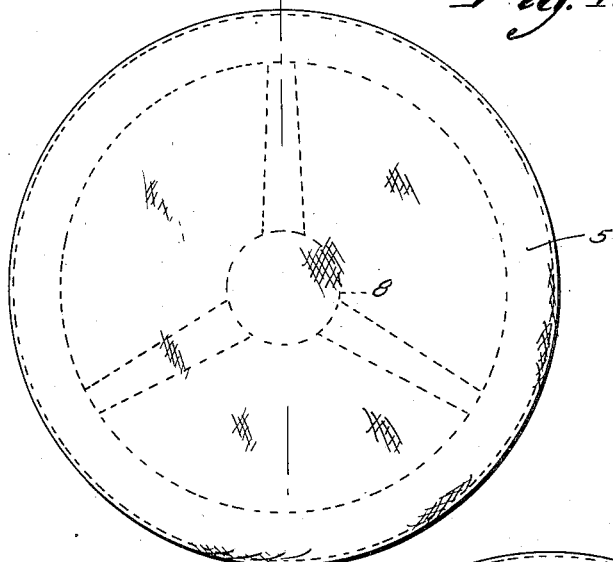
Fig. 1.
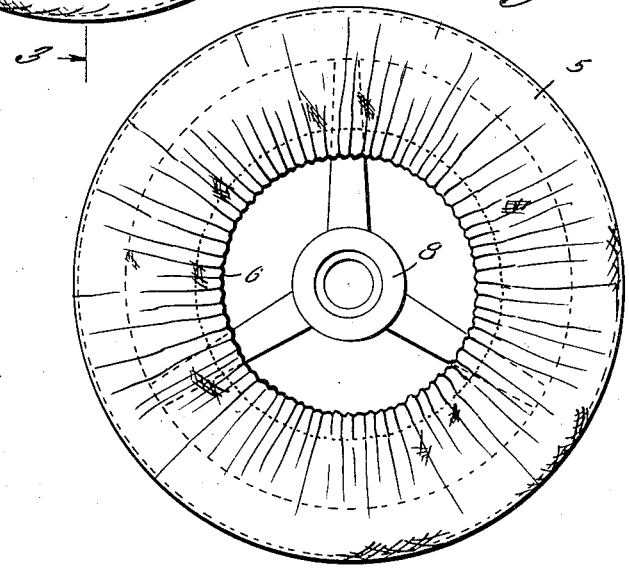
Fig. 2.
Fig. 3.
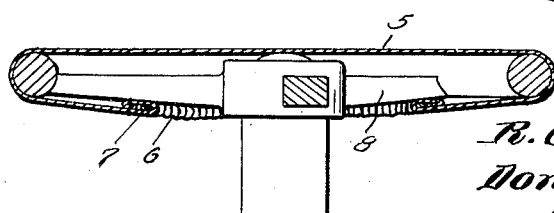
Inventors
R. C. Maxedon
Donald Penn
By Clarence A. O'Brien
Attorney Patented Apr. 16, 1935

1,997,738

UNITED STATES PATENT OFFICE 1,997,738

STEERING WHEEL COVER

Roy C. Maxedon, Seminole, Okla., and Donald Penn, Perryton, Tex.

Application November 20, 1934, Serial No. 753,958

1 Claim. (Cl. 150—52)

This invention relates to cover devices for covering the steering wheels of motor vehicles and has as its object the provision of such a cover that may be readily slipped onto the steering wheel and will snugly accommodate itself to the steering wheel in a manner to protect the same against being soiled as is often the case due to contact of the wheel by the dirty, greasy hand of the repairman. An object of the invention is to provide a cover of this character which may be made of any suitable material whatever and which can be rapidly applied to the vehicle wheel without requiring skill on the part of the person applying the cover to the wheel.

Further an object of the invention is to provide a cover of this character which can be cheaply and economically manufactured.

The invention together with its objects and advantages will be best understood from a study of the description taken in connection with the accompanying drawing wherein:

Figure 1 is a top plan view illustrating the application of the invention.

Figure 2 is a bottom plan view illustrating the application thereof.

Figure 3 is a detail view taken substantially on the line 3—3 of Figure 1.

Referring to the drawing in detail it will be seen that the cover includes a hollow body 5 formed of any suitable material, cloth, rubber, oilcloth, tire cover material, "cellophane" and paper, and is shaped to correspond with the shape of the steering wheel of the motor vehicle. The body is provided with an enlarged opening having a hem 6 in which is confined a suitable elastic member 7 preferably an elastic band that serves to contract the opening in the body and to draw the cover tightly about the steering wheel 8.

In the making of the body 5 preferably a circular sheet of the selected material is provided. This circular sheet is then hemmed at its marginal edge, the elastic member 7 being placed in position and the marginal edge of the material folded over and stitched in completing the hem and in a manner to thereby confine the elastic element within the hem, the hemmed edge of the sheet being crimped as clearly shown.

It will be obvious that the protector may be quickly applied to the steering wheel and when so applied will protect the rim of the wheel, fitting snugly about the wheel as illustrated.

Having thus described the invention, what is claimed as new is:

As a new article of manufacture, a cover for the steering wheels of motor vehicles, said cover comprising a substantially circular envelope adapted to be slipped over the steering wheel, said envelope consisting of a single circular sheet having a hem directly at its edge and an endless elastic member confined within said hem for drawing the envelope snugly about the steering wheel, the free edge being spaced from the steering post.

ROY C. MAXEDON.
DONALD PENN.